United States Patent

Kalman

[15] 3,692,985
[45] Sept. 19, 1972

[54] OPTICAL COUNTING METHOD AND APPARATUS

[72] Inventor: Gabor U. Kalman, 363 Brook St., Bristol, Conn. 06010

[22] Filed: Nov. 9, 1970

[21] Appl. No.: 87,844

[52] U.S. Cl. .........235/92 PK, 235/92 V, 235/92 SB, 235/98 C, 235/92 R, 250/227
[51] Int. Cl. ..............................................G06m 11/00
[58] Field of Search.235/92 V, 92 SB, 92 PK, 92 PC, 235/98 C, 98 R

[56] References Cited

UNITED STATES PATENTS

| 3,581,067 | 6/1971 | Willits et al. | 235/92 |
| 3,538,312 | 11/1970 | Genahr | 235/92 V |
| 1,998,132 | 4/1935 | Geffcken et al. | 235/98 C X |
| 3,234,360 | 2/1966 | Schooley | 235/92 V |

Primary Examiner—Maynard R. Wilbur
Assistant Examiner—Joseph M. Thesz, Jr.
Attorney—Fishman and Van Kirk

[57] ABSTRACT

The rapid and accurate counting of articles positioned in closely spaced relationship on a support is disclosed. The technique is implemented with the use of a movable detector head employing a linear array of optical fibers, the detector head being designed to provide a low friction sliding contact with the articles to be counted.

6 Claims, 3 Drawing Figures

PATENTED SEP 19 1972 3,692,985
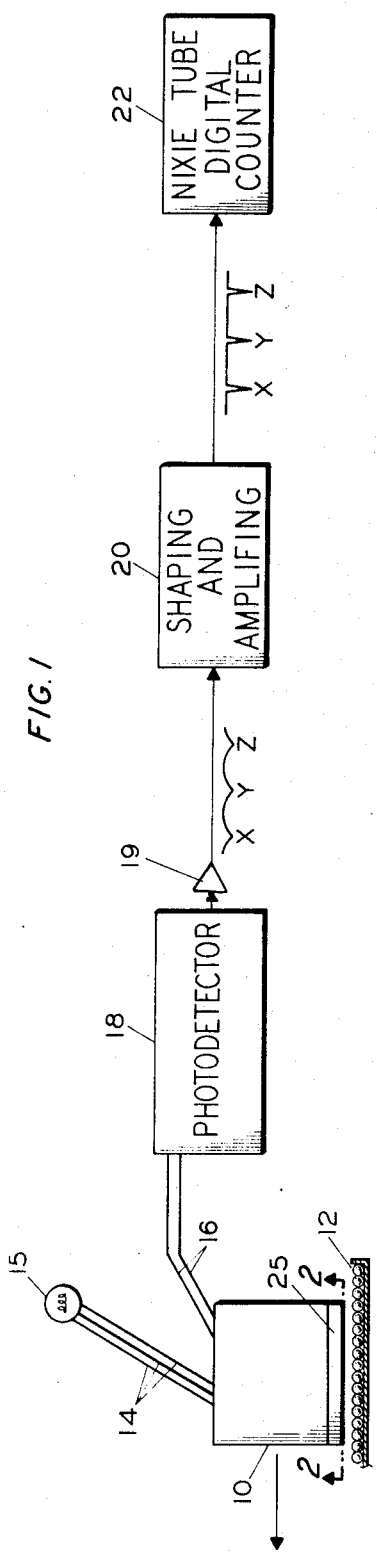
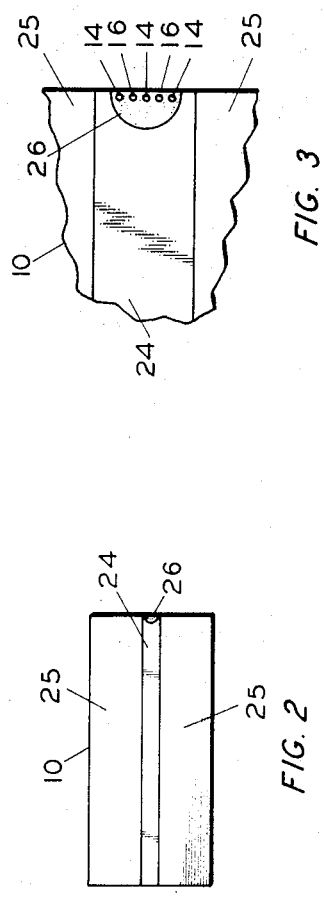
INVENTOR
GABOR U. KALMAN
BY Fishman and van itet
ATTORNEYS

OPTICAL COUNTING METHOD AND APPARATUS

BACKGROUND OF THE INVENTION

1. Field of the Invention

The present invention relates to the counting of articles and particularly articles of very small size. More specifically, the present invention is directed to optical counting systems characterized by a high degree of accuracy. Accordingly, the general objects of the present invention are to provide novel and improved methods and apparatus of such character.

2. Description of the Prior Art

While not limited thereto in its utility, the present invention is particularly well suited for the counting of very small articles such as, for example, needles. In the packaging for sale of needles it has previously been impossible for the manufacturer to count, in an economic manner, the number of individual articles placed in each package. Accordingly, it has been the practice in industry to "over" supply the customer by employing, in packaging quality control, techniques such as conservatively estimating quantity in terms of total package weight.

Optical counting techniques have been proposed, and in some cases implemented, for various measuring and testing purposes. Thus, for example, optical detection equipment has been employed to measure the proximity of a detector head to a curved surface, to detect holes in sheets of material, to sense surface characteristics, for color control, for liquid level detection or determination and to sense relative motion. Some of these prior art optical detection techniques and systems have employed optical fibers in an attempt to precisely locate a light source in relation to the object being tested or measured and/or to detector elements. The prior art optical measuring systems have, however, been characterized by a number of inherent deficiencies. A first of these deficiencies has been a lack of accuracy which has been manifested by the inability to count or sense very small objects. Other deficiencies have been relatively large size, complexity and high initial cost. All of these deficiencies have previously precluded the design and use of optical counting systems which could readily be positioned in actual contact with small articles to be counted without damaging either the articles or causing excessive wear of the detector head.

SUMMARY OF THE INVENTION

The present invention overcomes the above-discussed and other deficiencies of the prior art by providing a novel and improved technique for optically counting small articles and apparatus for implementing the said technique. In accordance with the present invention, a plurality of optical fibers are arranged in a linear array with alternate fibers being associated respectively with a light source and a light responsive signal generator. The fibers are mounted in a detector head adjacent the end of the head which will comprise the trailing edge thereof during a scanning operation. As positioned in the head, the line defined by the fibers will be substantially parallel with the major axis of articles to be counted, the fibers will be oriented perpendicularly to the plane in which the articles to be counted are supported and the ends of the fibers will be parallel to the supporting plane when the detector is in use. At least the portion of the detector head on which the optical fibers are mounted will be comprised of a low friction, long-service life material such as a carbide metal or "teflon".

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a block diagram of a preferred embodiment of the invention;

FIG. 2 is a bottom view, taken along line 2—2 of FIG. 1, of the detector head of the embodiment of FIG. 1; and FIG. 3 is an enlarged partial view of the detector head of FIG. 2.

DESCRIPTION OF THE PREFERRED EMBODIMENTS

With reference now to FIG. 1, the present invention is depicted in the environment of a counter for totalizing a number of small, elongated articles such as needles. The invention comprises a detector head 10 which, during the counting operation, will be positioned in close proximity to the articles to be counted. In practice, detector head 10 will usually be brought into contact with the articles, needles 12 in the example being described, which are supported on a tray or other planar surface. The articles to be counted may or may not be spatially separated on the support means; the necessity of separating the articles being a function of the reflectivity characteristics of their external surfaces. In the case of needles 12, the articles to be counted may be brought into actual side-by-side contact with one another since there is an adequate difference in the reflectivity between the surface of each article which will be perpendicular to the light source and those curved surfaces which will not be perpendicular to the light source.

As will become more apparent from the description below of FIGS. 2 and 3, a plurality of optical fibers are mounted in detector head 10. For purposes of explanation, five such optical fibers are disclosed in FIGS. 1 and 3. Three of these fibers, indicated by reference numeral 14, transmit light from a source 15 to the surface of the articles to be counted while the other two fibers 16 return light reflected from the articles being counted to suitable detection circuitry. While shown separated therefrom in FIG. 1 in the interest of clarity, it is to be understood that light source 15, which will typically comprise a miniature incandescent lamp, will be mounted within detector head 10. Accordingly, the only external connections to detector head 10 will be for the power source for lamp 15 and the optical return fibers 16. It is also to be noted that, in one embodiment of the invention, the diameter of fibers 14 and 16 is only 0.003 inches. The use of such small diameter optical fibers restricts the area seen by the detector and permits extremely good discrimination between "spaces" and the maximum reflectivity surfaces of the articles being counted.

As noted above, fibers 16 deliver the light reflected from the articles being counted to suitable detection circuitry. In a preferred embodiment of the invention, the fibers 16 carry the reflected light to a phototransistor light detector 18 which may also have a preamplifier 19 connected directly to the output side thereof. While also shown separated in the interest of clarity, photodetector 18 and preamplifier 19 are physically mounted within detector head 10. Considering the utilization of the present invention for counting needles, as the detector head 10 is moved across the needles, the detected signal varies between a "high" level corresponding to the tops of the needles, to a "low" level corresponding to the spaces between the needles. The electrical signal generated by photodetector 18, accordingly, varies as shown by the waveform applied to the output of the detector The "valleys" X, Y and Z of the detector output signal are commensurate with minimum reflectivity from the articles being counted. The points of maximum reflectivity or detected signal strength will, of course, be commensurate with substantially mutual perpendicularity between the light emitting ends of fibers 14, the surfaces of the articles 12 and the light receiving ends of fibers 16.

The electrical signal generated by photodetector 18 is applied to the input of shaping and amplifying circuitry 20. The shaping and amplifying circuitry may comprise a commercially available operational amplifier which provides signal amplification and thresholding. Shaping and amplifying circuitry 20 may also provide for correction for changes in average reflectivity of the top surfaces of the articles being counted. Shaping and amplifying circuitry 20 provides the output signal or pulse train shown wherein the "high" levels of the signal are commensurate with detection of each article passed by the linear array of optical fibers in head 10. The shaping circuitry provides sharply defined negative spikes; indicated at the output of circuitry 20 as X, Y and Z; commensurate with the spaces between adjacent articles 12.

The pulse train from shaping and amplifying circuit 20 is applied as the input signal to a solid state digital counter 22. In a preferred embodiment of the invention, the counter 22 provides a numerical display by employing Nixie tube type three digit electronic display. Counter 22 also comprises means, not shown in the interest of clarity, for resetting the counter to zero at the termination of each counting operation.

Referring now to FIGS. 2 and 3, detector head 10 is shown in greater detail. FIG. 2 shows the bottom of detector 10 and indicates a carbide or "Teflon" insert 24 mounted between and extending from sloping bottom surfaces 25 and which will typically be brought into contact with the articles to be counted. The use of a low friction material for insert 24 is in the interest of preventing damage to the articles being counted while simultaneously providing a low friction, long-service life front-face for the detector head. The insert 24 may be sandwiched between or embedded in any suitable supporting material. Alternately, the "low friction" material may be applied as a coating. As may best be seen from FIG. 3, the end of insert 24 which in part defines the trailing edge of the detector head is provided with a groove 26. The linear array of optical fibers is supported in groove 26 adjacent to and in parallel relationship to the head trailing edge. The fibers may be maintained in groove 26 through the use of any suitable potting compound. It is to be noted that the fibers are parallel to the trailing edge of the detector head and the ends of the fibers terminate or lie in a plane which is parallel to and slightly recesses (about 0.003 inches, for example) from the bottom surface of insert 24. Thus, considering the case where the articles to be counted are of elongated shape such as needles, the ends of the fibers 14 and 16 of the linear array will sequentially be brought into alignment with each article.

Also in accordance with the invention, the individual fibers of fiber groups 14 and 16 are alternately positioned in the linear array. This arrangement of the fibers may best be seen from consideration of FIG. 3.

As the detector head 10 is scanned across the articles to be counted with the linear array of optical fibers parallel to the articles, light from source 15 is transmitted through the first set of fibers 14, serially reflected off the articles 12 into the second set of fibers 16 and detected by the photodetector 18. The shaping and amplifying circuitry 20 provides a train of pulses; the intervals between each pulse corresponding to the low light level reflection from a space or interstice between the articles. Digital counter 22 is actuated by the pulse train from the shaping and amplifying circuitry 20 and produces a count of the number of articles scanned. The count is accurate to within ± one count or ± 0.3 percent. The detector head 10 is typically scanned in contact with the articles and is provided with an insert or covered with a carbide base or other low friction material. The linear array of the two sets of fibers 14 and 16 is positioned at the trailing edge of the detector head in the interest of uniformity and accurate counting.

While a preferred embodiment of the invention has been shown and described, various modifications and substitutions may be made thereto without departing from the spirit and scope of the invention. Accordingly, it is to be understood that the present invention has been described by way of illustration and not limitation.

What is claimed is:

1. Apparatus for optically counting articles in an array, the articles to be counted and the interstices therebetween having different degrees of reflectivity, the apparatus comprising:
   a light source;
   detector head means having a trailing edge;
   a plurality of optical fibers supported by said detector head for directing light from said light source onto the surface of the articles to be counted, said light directing optical fibers having radiating ends arrayed in a line adjacent said detector head trailing edge;
   light responsive signal generating means for providing an electrical signal commensurate with the intensity of the light applied thereto;
   a second plurality of optical fibers supported by said detector head for delivering light reflected from the surface of the articles to said signal generating means, said light directing and light delivering optical fibers being alternately arranged along said line; and means responsive to signals produced by said generating means for providing an indication of the number of articles crossed by said line during relative movement between said head and the articles.

2. The apparatus of claim 1 wherein said detector head means comprises:
a body having a groove in said trailing edge; and
means mounting the linear array defined by said ends of said optical fibers in said groove.

3. The apparatus of claim 2 wherein said detector head body has a surface for contacting the articles to be counted, said surface being comprised of a material having a low coefficient of friction, said contacting surface extending toward said trailing edge and having said groove therein.

4. The apparatus of claim 3 wherein said low friction material comprises a carbide base material.

5. The apparatus of claim 4 wherein said signal generating means comprises:
a photodetector;
signal shaping means responsive to electrical signals provided by said photodetector for generating a pulse train, commensurate with articles being counted; and
digital counter means responsive to said pulse train.

6. The apparatus of claim 1 wherein said signal generating means comprises:
a photodetector;
signal shaping means responsive to electrical signals provided by said photodetector for generating a pulse train, commensurate with interstices between articles being counted; and
digital counter means responsive to said pulse train.

* * * * *